(12) United States Patent
Han

(10) Patent No.: US 7,656,756 B2
(45) Date of Patent: Feb. 2, 2010

(54) COIL ROTATION PREVENTING STRUCTURE FOR OPTICAL PICK-UP ACTUATOR

(75) Inventor: Jeong Yeop Han, Seoul (KR)

(73) Assignee: LG Electronics Inc., Seoul (KR)

( * ) Notice: Subject to any disclaimer, the term of this patent is extended or adjusted under 35 U.S.C. 154(b) by 369 days.

(21) Appl. No.: 11/009,141

(22) Filed: Dec. 13, 2004

(65) Prior Publication Data

US 2005/0141360 A1 Jun. 30, 2005

(30) Foreign Application Priority Data

Dec. 24, 2003 (KR) .................... 10-2003-0096644

(51) Int. Cl.
*G11B 7/00* (2006.01)
(52) U.S. Cl. .................... 369/44.14; 720/683
(58) Field of Classification Search ......... 720/681–685; 369/244, 44.14–44.16, 112.23, 176, 44.22, 369/44.21, 44.18
See application file for complete search history.

(56) References Cited

U.S. PATENT DOCUMENTS

| 5,617,256 | A | * | 4/1997 | Mitsumori et al. | 720/683 |
| 5,949,590 | A | * | 9/1999 | Hong | 359/814 |
| 6,317,277 | B1 | * | 11/2001 | Izumino et al. | 369/44.15 |
| 6,504,813 | B2 | * | 1/2003 | Suzuki et al. | 720/683 |
| 2003/0021218 | A1 | * | 1/2003 | Song et al. | 369/244 |

* cited by examiner

*Primary Examiner*—Andrea L Wellington
*Assistant Examiner*—Nathan Danielsen
(74) *Attorney, Agent, or Firm*—Ked & Associates LLP

(57) ABSTRACT

An optical pickup actuator includes a lens holder on which tracking and focusing coils are attached, at least one of the coils being a polygon coil having at least two sides that are different in a length from each other, magnets disposed facing the coils, and a rotation preventing unit formed on the lens holder. The rotation preventing unit surface-contacts an inner surface of the polygon coil to prevent the polygon coil from being twisted.

16 Claims, 9 Drawing Sheets

⇧ Focusing Force Direction
---▶ Current Flow Direction
⤴ {Tilting Force Direction
    Tilt Moment Direction}

⇨ Tracking Force Direction
⇧ Focusing Force Direction
--→ Current Flow Direction ⇨ Tracking Force(TF)

⌒ additional reverse torque

⋯ obstacle of the rolling mode

COIL ROTATION PREVENTING STRUCTURE FOR OPTICAL PICK-UP ACTUATOR

BACKGROUND OF THE INVENTION

1. Field of the Invention

The present invention relates to a coil rotation preventing structure installed on a side portion of a lens holder for an optical pick-up actuator.

2. Description of the Related Art

Generally, an optical pick-up actuator functions to constantly maintain a relative distance between an object lens and an optical medium (i.e., a disk) by moving structural elements (a lens holder, a bobbin, a coil, and the like) including the object lens. In addition, the optical pick-up actuator runs along a track formed on the optical medium to write/read the information on/from the optical medium.

FIG. 1 shows a prior optical pick-up actuator.

Referring to FIG. 1, a prior optical pick-up actuator 200 includes a lens holder 202, on a center of which an object lens 201 is movably mounted and magnetic circuit assemblies disposed around the lens holder 202.

The magnetic circuit assembly includes tracking and focusing coils 205 and 206, a tilt coil 217, a yoke 203 and multi-polar magnet assemblies 204 disposed facing opposite surfaces of the lens holder 202.

The focusing coils 205 are disposed on left and right sides of the opposite surfaces of the lens holder 202, opposing a vertical border of the magnet polarity. The tracking coils 206 are disposed between the focusing coils 205 on the both surfaces of the lens holder 202, opposing a horizontal border of the magnet polarity. A damper (wire suspensions) 207 functioning as a current transmission unit and a tilt coil 217 are installed around the lens holder 202.

As shown in FIGS. 1, 2 and 3, each of the magnet assemblies 204 includes two ⌐-shaped magnets 204a and 204b that are symmetrically disposed each other and magnets 204c and 204d disposed on bottoms of the ⌐-shaped magnets 204a, the magnets 204c and 204d having a polarity opposite to the respective ⌐-shaped magnets 204a and 204b.

The number of magnets and the polarities of the magnets may be varied.

The magnet assemblies 204 are fixed on an inner surface of the U-shaped yoke 203 formed of a ferromagnetic body.

First ends of the parallel wire suspensions 207 are fixed on a fixing portion 208 formed on the lens holder 202 and second ends of the parallel wire suspensions 207 are fixed on a main board (not shown) via a frame 209 spaced away from the lens holder 202.

The wire suspensions 207 functions to suspend the lens holder 102 and supply the current.

The operation of the prior optical pickup actuator will be described hereinafter.

Referring to FIGS. 1, 2 and 3, when the current is applied to the focusing coils 205, vertical magnetic flux is created, thereby performing the focusing drive of the lens holder.

At this point, the magnetic flux of the multi-polar magnet assemblies 204 facing the focusing coils 205 acts electromagnetically to move the focusing coils 205 and the lens holder 202 in the focusing direction (in the vertical direction).

When the current is applied to the tracking coils 206, the multi-polar magnet assemblies 204 and the tracking coil 206 and the lens holder 202 are driven in the tracking direction (in the horizontal direction).

When the current is applied to the tilt coil 217 wound around the lens holder 202, as shown in FIG. 2, left and right sides of the lens holder 202 pivots in an opposite direction to each other by the opposite polarity between the magnets 204a and 204b opposing the tilt coil 217 according to Lorentz force.

The lens holder 202 should be designed to move in focusing and tracking directions perpendicular to each other without any vibration, rotation and twisting.

However, when the lens holder 202 is driven in the tracking direction, as shown in FIG. 3, since the weight center of the lens holder 202 does not accord with the tracking force center of the tracking coil 206, the lens holder 202 operates in a rolling mode at a high frequency range. As a result, the phase of the lens holder 202 is deformed.

That is, since the weight center in the vertical direction is a center of the lens holder while the weight center of the tracking direction is a center of the tracking, when the lens holder is driven in the tracking direction, the weight center in the tracking direction is varied due to the imbalance of the magnetic force.

In addition, the weight center may be offset upward from the center by the magnetic flux distribution formed by the multi-polar magnet assemblies. In order to solve this problem, a dummy mass (220 in FIG. 1) may be provided on a side portion of the top of the lens holder to heighten the weight center.

A tracking coil structure for solving the above-described problem will be described hereinafter with reference to FIGS. 4 through 6. The description of the same or like parts depicted in FIG. 1 will be omitted herein.

As shown in FIGS. 4A and 4B, the tracking coils 306 attached on the opposite surfaces of the lens holder 302 are formed in a trapezoid shape where the upper winding width is lesser than the lower winding width. That is, each of the tracking coils 306 has a triangular weight center.

In the operation, since the trapezoid tracking coils 306 are wound in a proper direction on the opposite surfaces of the lens holder 302 to generate attraction and repulsion by the electromagnetic force generated by the combination of the multi-polar magnet assemblies 304.

By the attraction and repulsion, the lens holder 302 is driven in the tracking direction (in the horizontal direction).

At this point, when the lens holder 302 is moved in the tracking direction by the tracking force TF in the rolling mode, the lens holder 302 horizontally pivots in the tracking direction by a reverse direction compensating torque TFc generated together with the tracking force TF by the tracking coil. That is, the trapezoid shape of the tracking coils 306 functions to lower the tracking center.

FIG. 5 shows a vector graph of the trapezoid tracking coils. As shown in the drawing, when the current is applied to the trapezoid tracking coils, the force F in the tracking direction is generated in a direction perpendicular to both inclined sides of the trapezoid tracking coils. That is, as the vector F is force (vector Fx+vector Fy, where the vector Fx is force in a direction of an X-axis and Fy is force in a direction a Y-axis) in the tracking direction.

Here, a torque causing vibration that causes the occurrence of the rolling by the vector Fx is Fx*bo where the bo is a difference between the tracking center TC and the weight center WC.

Generally, the Fx is greater than the Fy, it is possible to eliminate the occurrence of the rolling using the Fy.

At this point, the compensation torque (TFc) is 2*d1*Fy. Here, 2*d1 is a distance between the both sides of the tracking coil at a tracking force center line. The torque causing vibration, which causes the rolling is generated by the vector Fx and the reverse compensating torque is generated by the vector Fy. At this point, since the vector Fx is greater than Fy, the tracking sensitivity is not deteriorated and the rolling can be eliminated without increasing the mass of the lens holder.

Accordingly, the trapezoid tracking coils 306 are located on center portions of the opposite surfaces of the lens holder to drive the lens holder in the tracking direction by the force F (Fx+Fy) in the tracking direction and the compensation torque TFc(Fy). As a result, the tracking sensitivity is not deteriorated and the rolling can be eliminated without increasing the mass of the lens holder.

As a result, the rolling problem caused by the ascending of the tracking center of the tracking coils facing the 4-polar magnet assemblies from the weight center of the lens holder can be solved.

FIGS. 6A and 6B show driving states in the tracking direction and frequency properties of the rectangular tracking coil and the trapezoid tracking coil.

As shown in the drawings, by varying a shape of the tracking coil from the rectangular shape (206) to the trapezoid shape (306), the reverse torque TFc is generated by the offset between the tracking center TC and the weight center to eliminate residual torque, thereby preventing the rolling causing the vibration.

However, since the trapezoid coils have an asymmetrical structure, it cannot be wound around a bobbin. Therefore, the coils is first wound in the rectangular shape using a machine and then directly attached on the opposite surfaces of the lens holder.

To solve the above problem, as shown in FIG. 7a, the focusing coils are fixed on the lens holder 302 by bobbins 315 and the tracking coils 306 are hooked and fixed on upper and lower projections 318 and 319 that are integrally formed on the lens holder 302.

The upper projection 318 for the trapezoid tracking coil 306 is formed in an egg shape to minimize the contacting surface with the inner surface of the trapezoid tracking coil 306. In addition, the lower projection is formed in a circular shape to point-contact the inner surface of the trapezoid tracking coil 306. That is, the upper and lower projections 318 and 319 support the tracking coil 306 only in a vertical direction.

However, as shown in FIG. 7b, the tracking coil 306 is twisted in a direction as its attached location.

That is, since the lower projection 319 supports the tracking coil 306 through the point-contact, when the lower portion of the tracking coil 306 rotates, the upper portion of the tracking coil 306 also rotates, thereby twisting the tracking coil. As a result, there may be many problems in manufacturing the products.

In addition, when the tracking coil 306 is twisted from its normal position, abnormal electromagnetic force is generated between the tracking coil 306 and the magnet assembly, thereby making it difficult to obtain the normal tracking servo.

SUMMARY OF THE INVENTION

Accordingly, the present invention is directed to a coil rotation preventing structure for an optical pick-up actuator that substantially obviates one or more problems due to limitations and disadvantages of the related art.

An object of the present invention is to provide a structure for preventing a coil having at least two sides that are different in a length or having a narrow top and a wide bottom.

Another object of the present invention is to provide a coil rotation preventing structure for an optical pick-up actuator, which has trapezoid rotation preventing projections that are formed on respective opposite surfaces of the lens holder, respectively, to surface-contact respective trapezoid tracking coils, thereby preventing the tracking coil from being twisted.

Still another object of the present invention to provide one or more rotation preventing structures that are symmetrical.

Sill yet another object of the present invention to provide a coil rotation preventing structure for an optical pick-up actuator, which has an upper rotation preventing projection contacting an upper inner surface of a tracking coil and a lower rotation preventing structure contacting a lower inner surface of the tracking coil.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical pickup actuator comprising: a lens holder on which tracking and focusing coils are attached, at least one of the coils being a polygon coil having at least two sides that are different in a length from each other; magnets disposed facing the coils; and a rotation preventing unit formed on the lens holder, the rotation preventing unit surface-contacting an inner surface of the polygon coil to prevent the polygon coil from being twisted.

In another aspect of the present invention, there is provided an optical pickup actuator comprising: a lens holder on which tracking and focusing coils are attached; magnets disposed facing the coils; and at least two rotation preventing units formed on the lens holder, the rotation preventing units surface-contacting inner surfaces of the tracking coils to prevent the tracking coils from being twisted, each of the tracking coils at least two sides that are different in a length from each other.

In still another aspect of the present invention, there is provided an optical pickup actuator comprising: a lens holder with more or more object lens; focusing and tracking coils and magnets that are provided to move the lens holder; an actuator fixing holder on which an supporting member for supporting the lens holder is fixed; and at least two rotation preventing units formed on the lens holder, the rotation preventing units having a shape corresponding to the respective tracking coils and surface-contacting inner surfaces of the tracking coils to prevent the tracking coils from being twisted.

According to the present invention, as a coil rotation preventing structure for an optical pick-up actuator, which has trapezoid rotation preventing projections that are formed on respective opposite surfaces of a lens holder, respectively, to surface-contact respective trapezoid tracking coils, is provided on at least one of opposite surfaces of the lens holder, the twist of the tracking coil can be effectively prevent.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
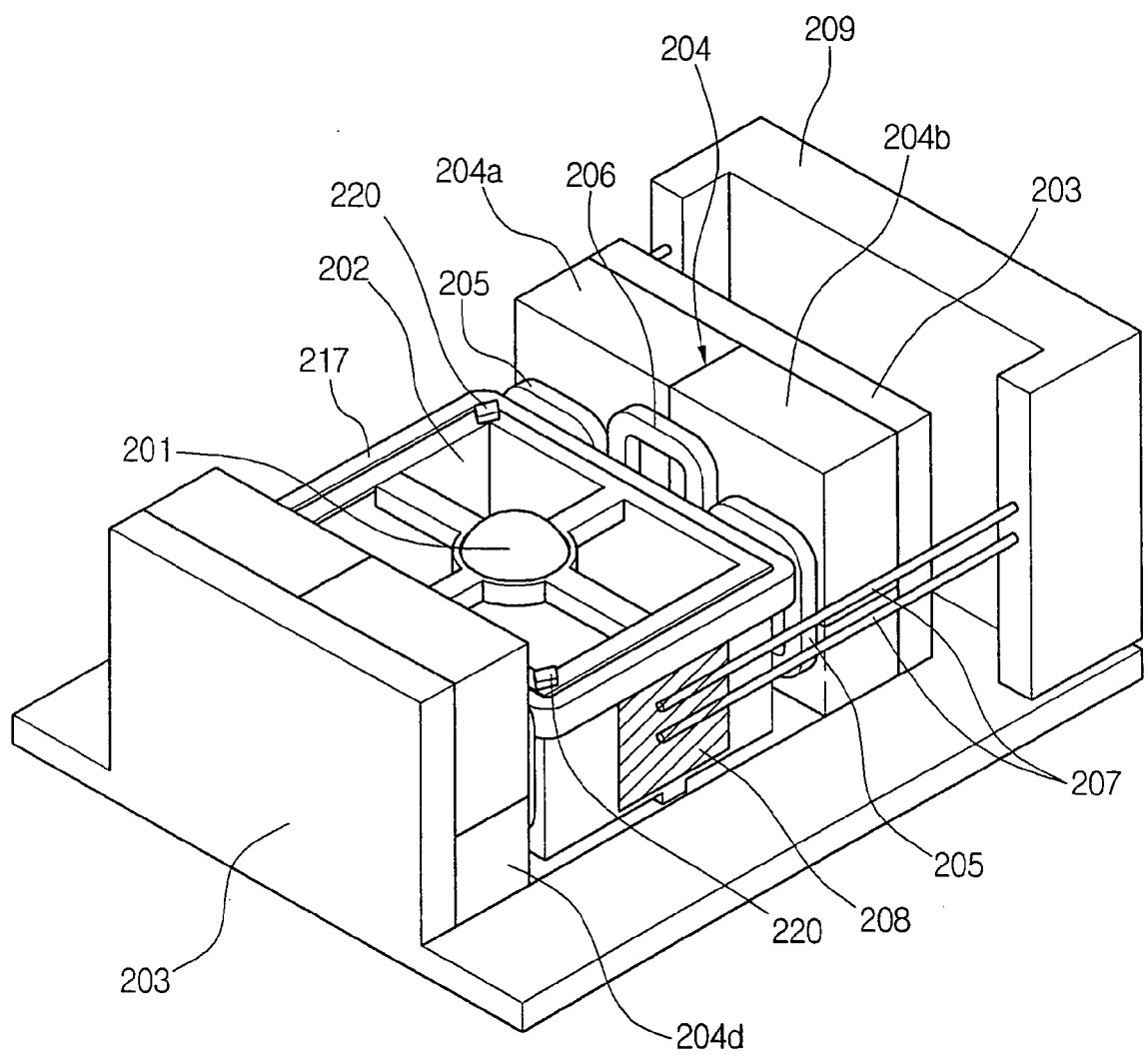
FIG. 1 is a perspective view of a prior optical pickup actuator.
Figure 2:
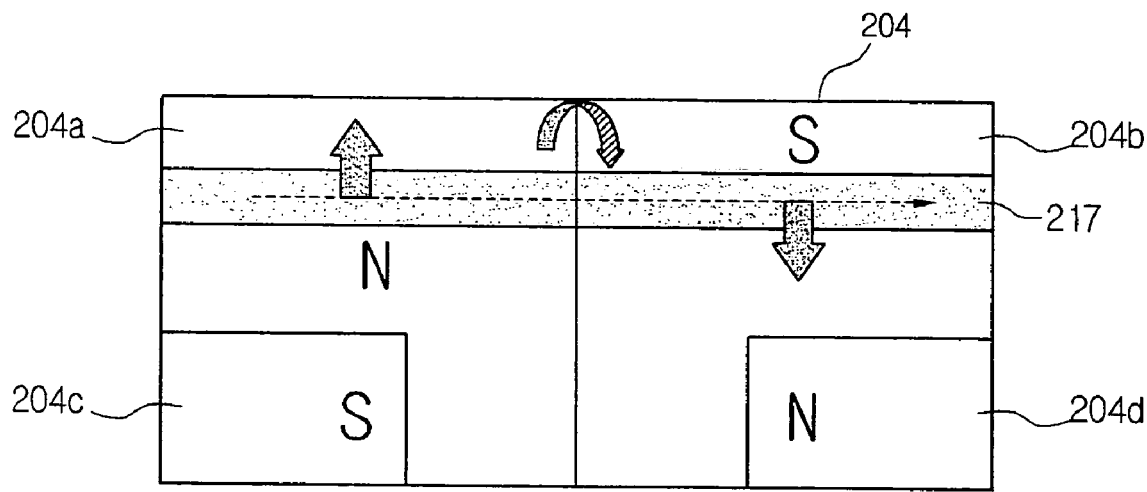
FIG. 2 is a view illustrating a tilt drive by a tilt coil of a magnetic circuit depicted in FIG. 1.
Figure 3:
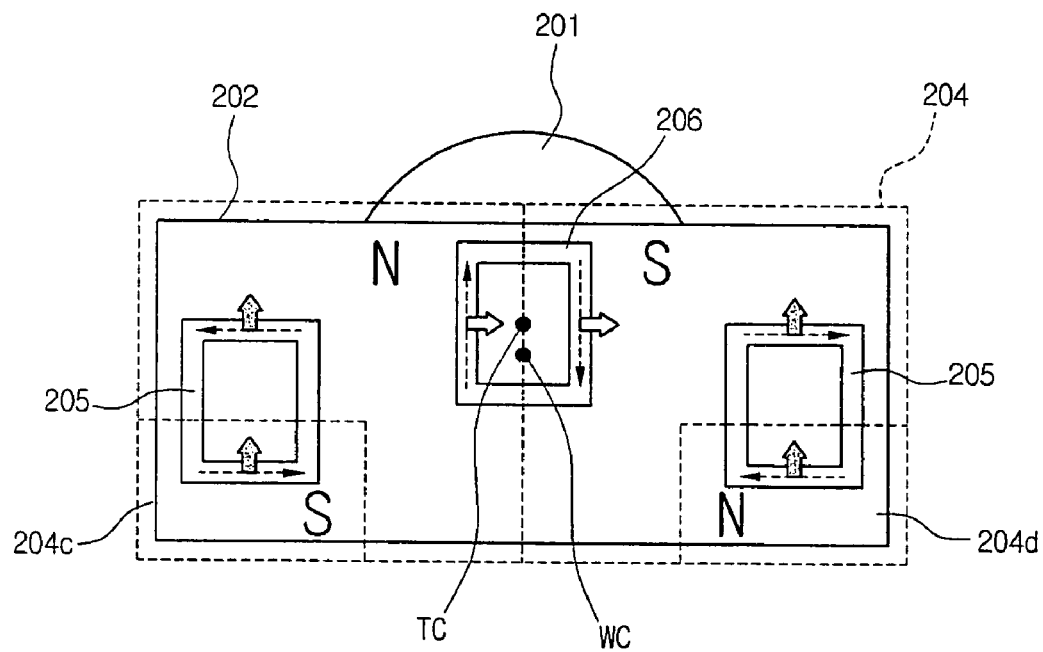
FIG. 3 is a view illustrating a focusing and tracking in a prior optical pickup actuator.
Figure 4A:
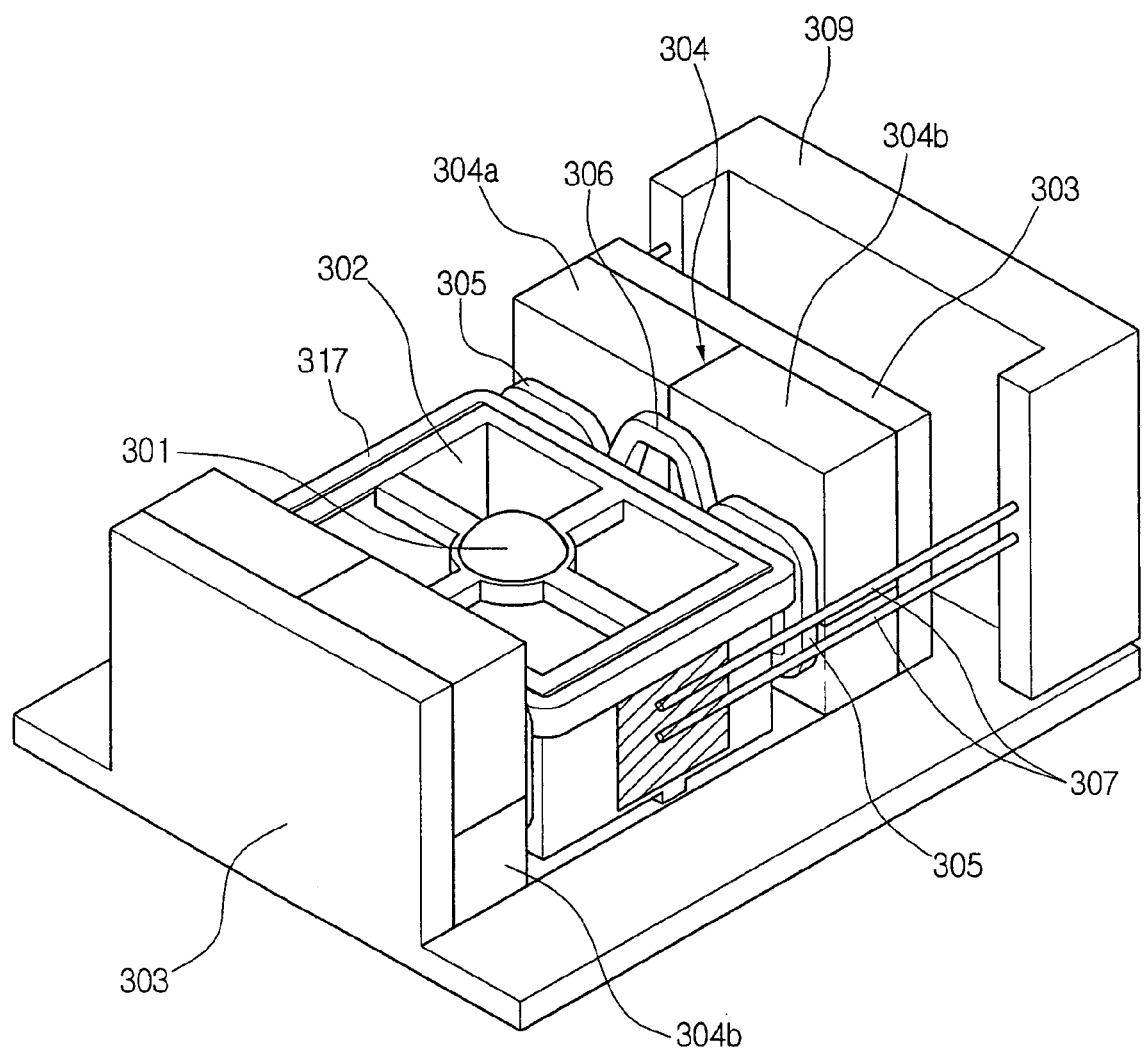
FIGS. 4A and 4B are views illustrating another prior optical pickup actuator.
Figure 4B:
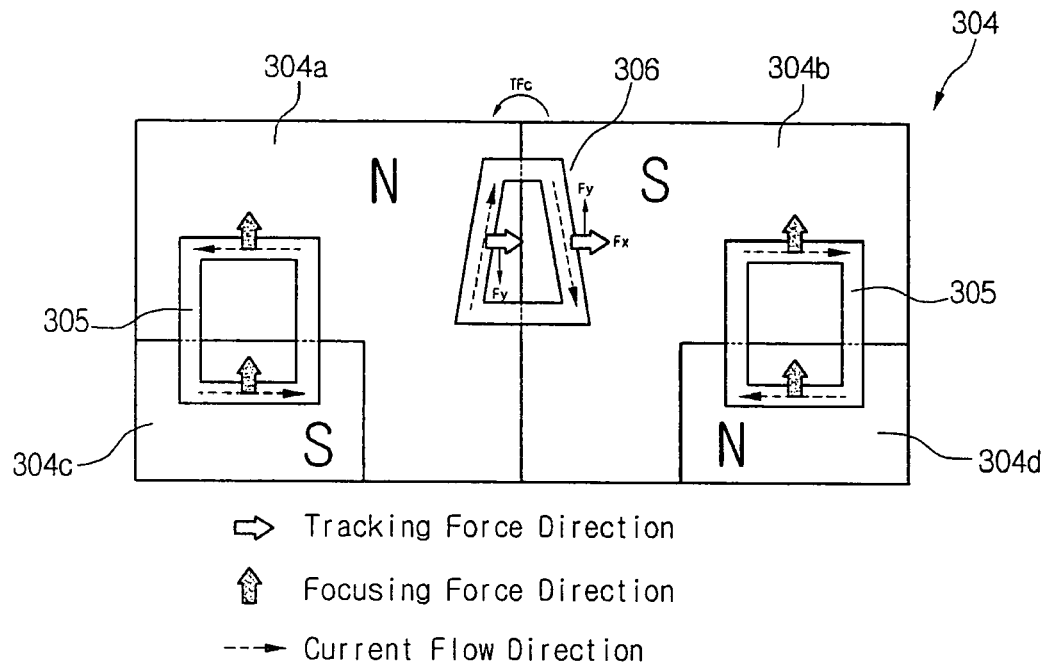
Figure 5:
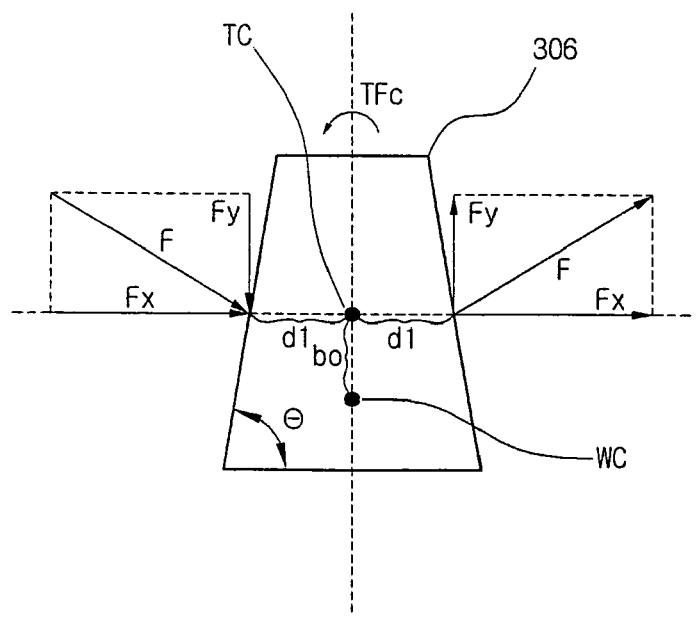
FIG. 5 is a view illustrating a vector of a prior tracking coil.
Figure 6A:
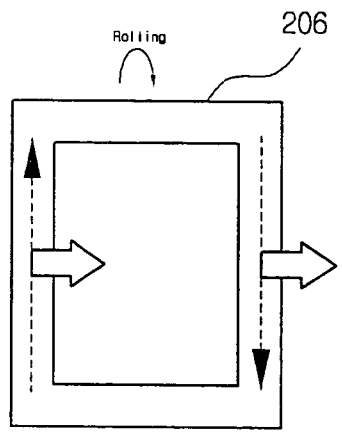
FIGS. 6A and 6B are magnetic circuit diagrams of FIGS. 4A and 4B.
Figure 6B:
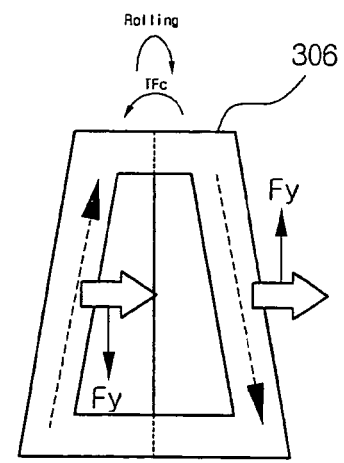
Figure 6B:
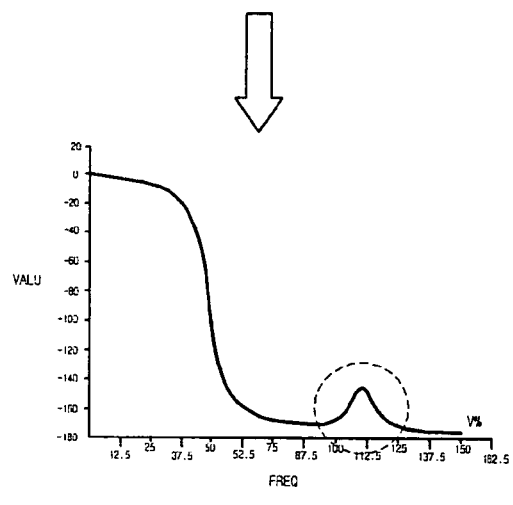
Figure 6B:
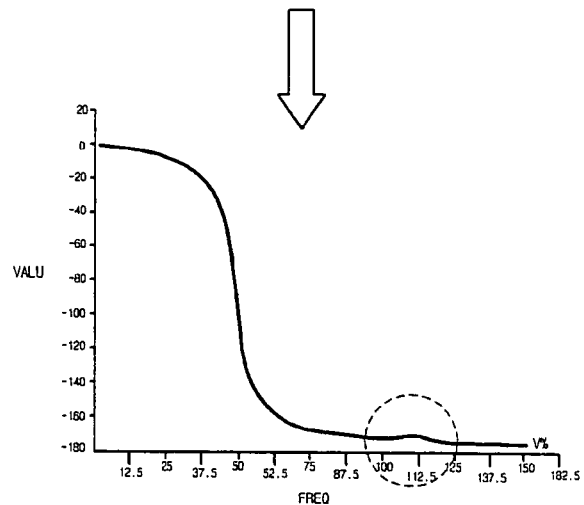
Figure 7A:
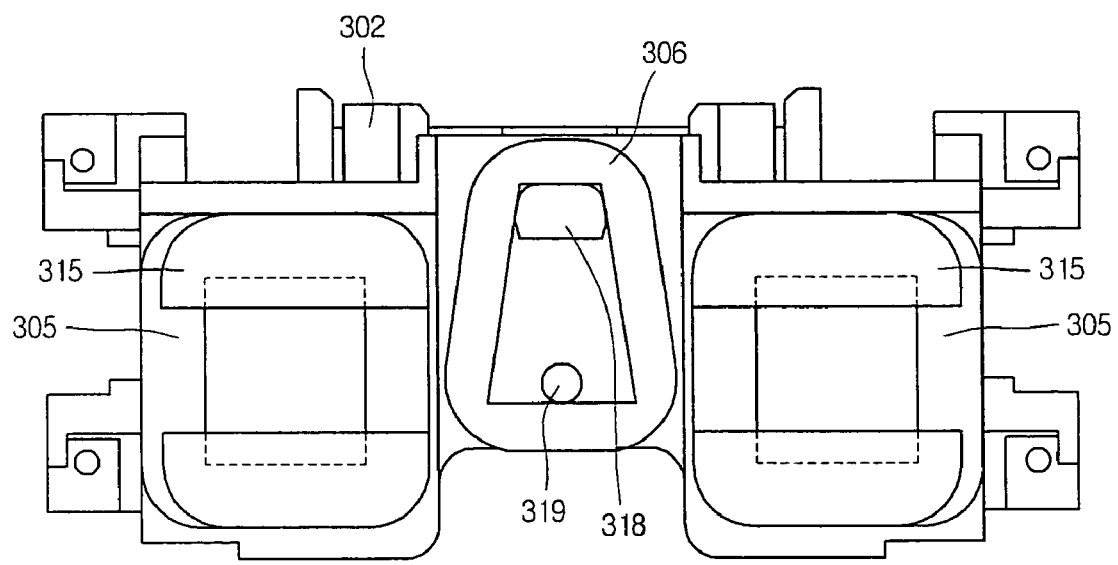
FIG. 7 is a view illustrating a problem of a coil rotation preventing structure depicted in FIG. 4.
Figure 7B:
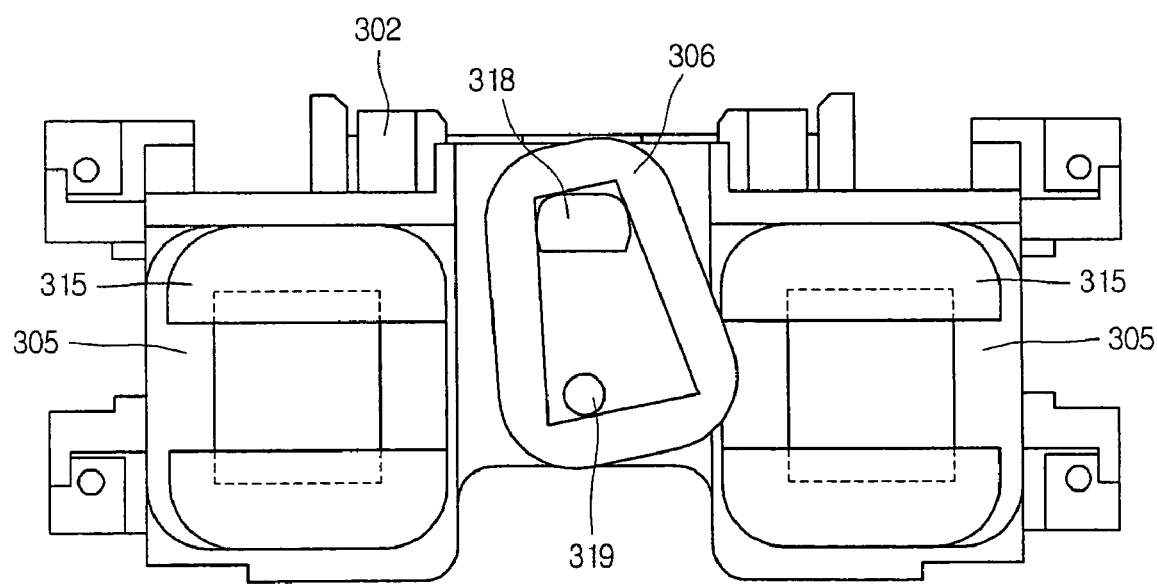
Figure 8:
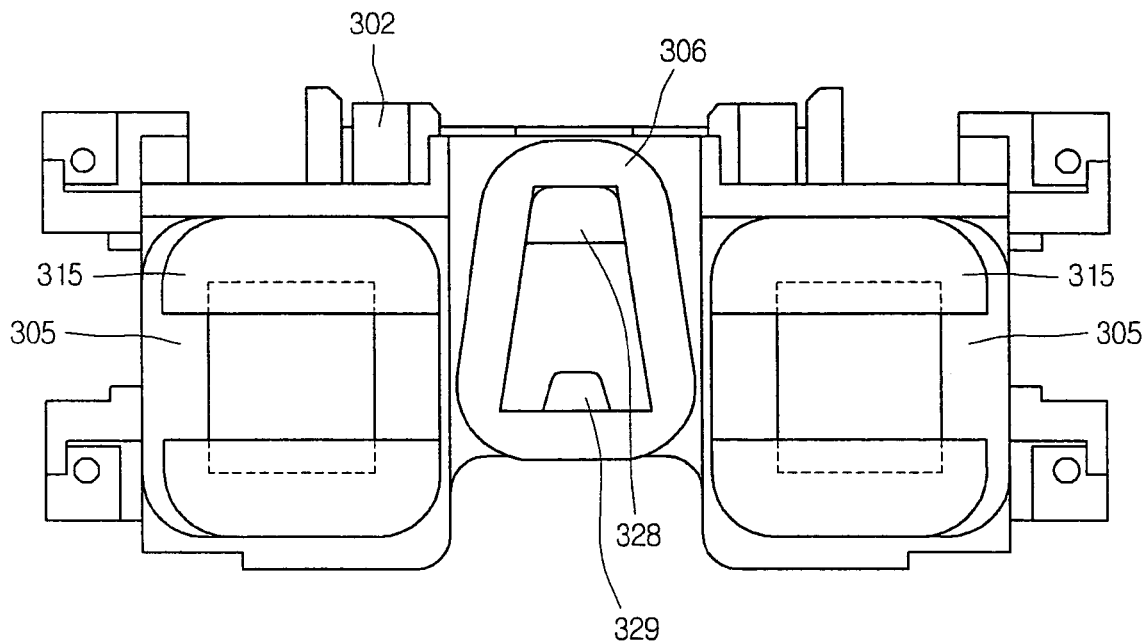
FIG. 8 is a side view of a lens holder with a coil rotation preventing structure according to an embodiment of the present invention.

FIG. 8 shows a side view of a lens holder for an optical pickup actuator, where a tracking coil rotation preventing structure according to an embodiment of the present invention is applied.

Referring to FIG. 8, an optical pickup actuator includes a lens holder 302 for supporting an object lens, tracking and focusing coils 306 and 305 attached on opposite surfaces of the lens holder 302, the tracking coils 306 being formed in a trapezoid shape, and upper and lower rotation preventing projections 328 and 329 formed on each of the opposite surfaces of the lens holder 302, the upper and lower rotation preventing projections 328 and 329 surface-contacting an inner circumference of the corresponding tracking coil 306 to prevent the trapezoid tracking coils 306 being twisted.

That is, the focusing coils 305 are wound around respective bobbins 315 and attached on left and right sides of the opposite surfaces on the lens holder 302 and the tracking coils 306 are wound in a trapezoid shape by a machine and attached on the opposite surfaces of the lens holder 302 between the focusing coils 305.

That is, the tracking coil 306 has at least two sides that are different in a length.

Here, the upper and lower rotation preventing projections 328 and 329 are integrally formed on each of the opposite surfaces of the lens holder 302 to guide the disposition of the corresponding tracking coil 306 and prevent the tracking coil 306 from being twisted.

That is, the upper and lower rotation preventing projections 328 and 329 are formed on a portion of the lens holder 302, where the corresponding tracking coil 306 will be attached.

That is, the upper and lower rotation preventing projections 328 and 329 are formed on a portion of the lens holder 302, where the corresponding tracking coil 306 will be attached.

The upper rotation preventing projection 328 is designed to surface-contact the upper inner surfaces of the tracking coil 306, being formed in a trapezoid shape. That is, the upper rotation preventing projection 328 is designed having a width almost identical to that of the upper inner portion of the tracking coil 306.

Describing in more detail, a top of the upper rotation preventing projection 328 surface-contacts an inner surface of a top of the tracking coil 306 and both sides of the upper rotation preventing projection 328 surface-contacts inner surfaces of both sides of the tracking coil 306. Upper corners of the upper rotation preventing projection 328 are rounded to prevent the coil from being damaged and make it easy to locate the tracking coil 306 around the projection 328.

The lower rotation preventing projection 329 is also formed in a trapezoid shape, surface-contacting an inner middle surface of a bottom of the tracking coil 306.

Heights of the upper and lower rotation preventing projections 328 and 329 are almost identical to that of the tracking coil 306.

A width of the bottom of the lower rotation preventing projection 329 is determined such that it can surface-contact more than ⅓ inner surface of the bottom of the tracking coil.

As described above, since the upper and lower rotation preventing projections 328 and 329 are designed to surface-contact at least two inner surfaces of the tracking coil 306, the twist of the tracking coil 306 attached on the lens holder 302 can be prevented. Furthermore, since the upper rotation preventing projection 328 is formed in the trapezoid shape, it can surface-contact inner surfaces of three sides of the upper portion of the tracking coil 306, which has relatively less attaching force, thereby the twist of the tracking coil 306 can be more reliably prevented.

FIGS. 9 through 12 show a variety of modified examples of the present invention.

Figure 9:
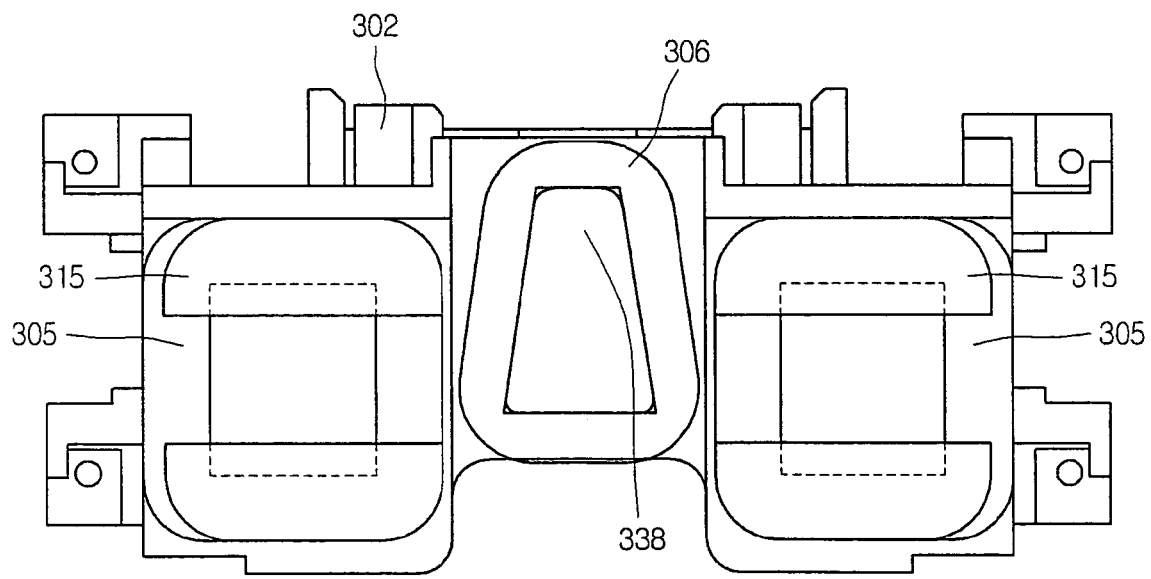
FIGS. 9 through 12 are views of modified examples of a coil rotation preventing structures according to the present invention.

In FIG. 9, a rotation preventing projection 338 is formed in a trapezoid single unit, which surface-contacts an inner surface of a trapezoid tracking coil 306 to prevent the tracking coil 306 from being twisted. In addition, corner of the rotation preventing projection 338 are rounded so that the trapezoid coil can be easily inserted around thereof and prevented from being damaged.

Figure 10:
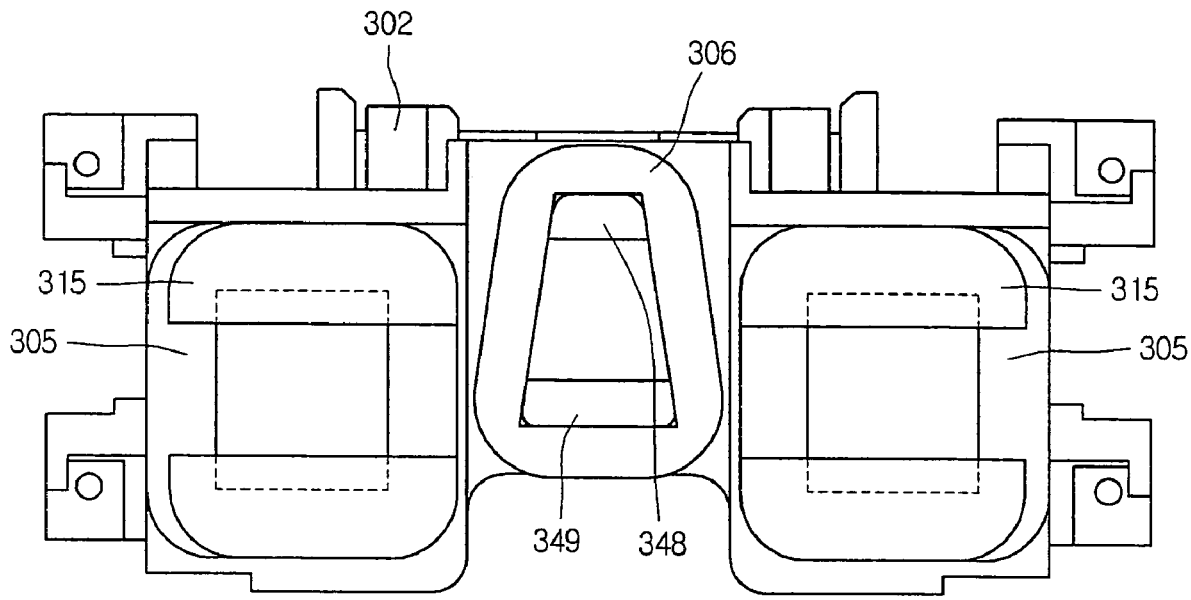

In FIG. 10, two trapezoid rotation preventing projections 348 and 349 are disposed to support to upper and lower portions of a trapezoid tracking coil 306. The trapezoid rotation preventing projections 348 and 349 have an identical width to that of the corresponding upper and lower portions of the trapezoid tracking coil 306.

That is, the upper trapezoid rotation preventing projection 348 is designed to surface-contact inner surfaces of three sides (i.e., top and two sides) of the upper portion of the tracking coil 306. Upper both corners of the upper rotation preventing projection 348 are rounded.

The lower trapezoid rotation preventing projection 349 is designed to surface-contact the inner surfaces of the three sides (i.e., bottom and two sides) of the tracking coil 306. Lower both corners of the lower rotation preventing projection 349 are rounded.

Figure 11:
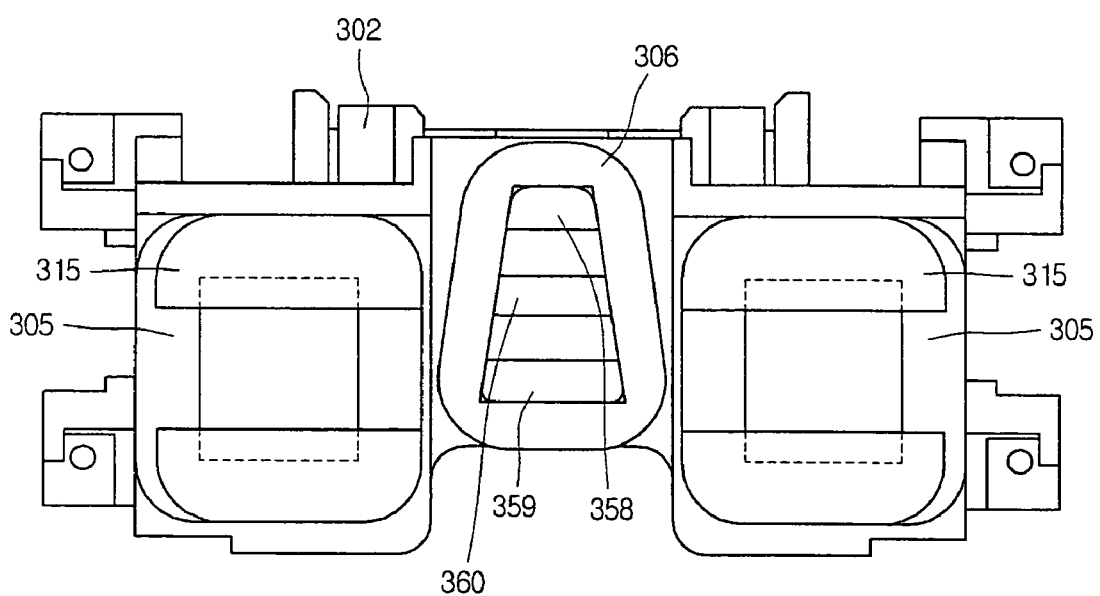

In FIG. 11, three rotation preventing projections 358, 359 and 360 are provided to support upper, middle and lower portions of a trapezoid tracking coil 306. Each width of the projections 358, 359 and 360 is identical to that of the corresponding portion of the tracking coil 306.

Figure 12:
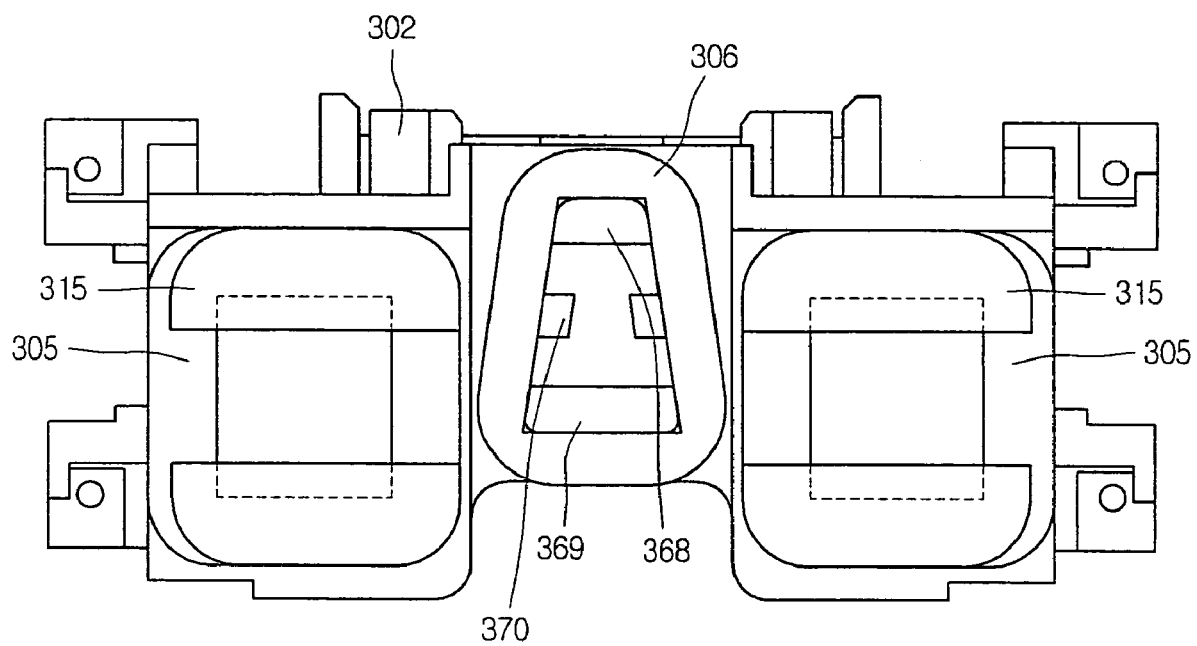

In FIG. 12, rotation preventing projections are composed of upper and lower projections 368 and 369 and left and right middle side projections 370. The left and right middle side projections 370 are designed to surface-contact both inner middle sides of the tracking coil 306.

Figure 13:
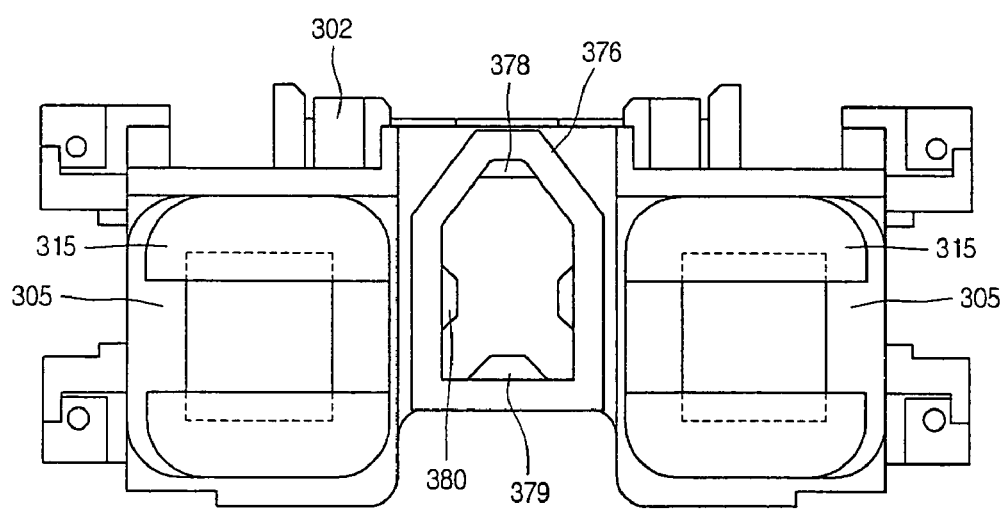
FIG. 13 is a view of a coil rotation preventing structure for a tracking coil formed in a different shape according to the present invention.

The tracking coil may be wound in other shapes such as a pentagon and a hexagon. When the tracking coil is formed in the pentagon, as shown in FIG. 13, at least four rotation preventing projections 378, 379 and 380 are formed to surfaces contact inner surfaces of six sides.

That is, the projections are comprised of the upper and lower rotation preventing projection 378 and 379 and the side rotation preventing projections 380. The upper rotation preventing projection 378 is disposed to surface-contact the inner surfaces of a top and both inclined sides extending from the top of the tracking coil 376 and the side rotation preventing projections 380 are disposed to respectively surface-contact the inner surfaces of parallel sides extending from the inclined sides. The lower rotation preventing projection 379 is formed to surface contacting the inner surface of the bottom of the tracking coil 376.

The above-described concepts of the present invention can be also applied to other coils that are not wound around the bobbin. In addition, the shape of the rotation preventing projection can be varied in accordance with the shape of the coil structure. The number of the rotation preventing projection can be selectively varied.

According to the present invention, since one or more rotation preventing projections is integrally formed on the lens holder to surface-contact the tracking coil, the twist of the tracking coil can be effectively prevented.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical pickup actuator, comprising:
a lens holder to which tracking and focusing coils are attached, at least one of the coils being a non-rectangular polygon coil having at least two sides that are different in length from each other;
a plurality of magnets disposed facing the tracking and focusing coils; and
a rotation preventing device formed on the lens holder, the rotation preventing device surface-contacting an inner surface of the non-rectangular polygon coil to prevent the non-rectangular polygon coil from being twisted,
wherein the rotation preventing device comprises at least two rotation preventing projections including an upper rotation preventing projection formed in the shape of an asymmetrical structure corresponding to the shape of the non-rectangular polygon coil and a lower rotation preventing projection formed in the shape of an asymmetrical structure corresponding to the shape of the non-rectangular polygon coil, and
wherein the lower rotation preventing projection surface-contacts only the inner surface of a bottom of the non-rectangular polygon coil and has a surface-contacting width greater than ⅓ of the inner surface of the bottom of the non-rectangular polygon coil and less than the entire width of the inner surface of the bottom of the non-rectangular polygon coil.

2. The optical pickup actuator according to claim 1, wherein the upper rotation preventing projection surface-contacts inner surfaces of a top and both sides of the non-rectangular polygon coil.

3. The optical pickup actuator according to claim 2, wherein the upper rotation preventing projection is smaller than an inner upper half of the polygon coil.

4. The optical pickup actuator according to claim 2, wherein the lower rotation preventing projection is smaller than an inner lower half of the non-rectangular polygon coil.

5. The optical pickup actuator according to claim 2, wherein upper corners of the upper rotation preventing projection are rounded and upper corners of the lower rotation preventing projection are rounded.

6. The optical pickup actuator according to claim 1, wherein each of the at least two rotation preventing projections; surface-contacts the inner surface of the polygon non-rectangular coil.

7. The optical pickup actuator according to claim 1, wherein the non-rectangular polygon coil is the tracking coil, which is trapezoidal in shape, in which a width of a base side of the lower rotation preventing projection is larger than a width of an upper side of the lower rotation preventing projection.

8. The optical pickup actuator according to claim 1, wherein the at least two rotation preventing devices are projected from a side surface of the lens holder.

9. The optical pickup actuator according to clam 1, wherein each non-rectangular tracking coil is trapezoidal in shape, and a width of a base side of the lower rotation preventing projection, which partly contacts the inner surface of the bottom of each non-rectangular tracking coil, is larger than a width of an upper side of the lower rotation preventing projection.

10. The optical pickup actuator according to claim 1, wherein the asymmetrical structure is formed in the shape of a trapezoid.

11. An optical pickup actuator, comprising:
a lens holder to which tracking and focusing coils are attached;
a plurality of magnets disposed facing the tracking and focusing coils; and
at least two rotation preventing devices formed on the lens holder, the at least two rotation preventing devices surface-contacting inner surfaces of the tracking coils to prevent the tracking coils from being twisted,
wherein the at least two rotation preventing devices include an upper rotation preventing projection formed in the shape of an asymmetrical structure corresponding to the shape of the tracking coils and a lower rotation preventing projection formed in the shape of an asymmetrical structure corresponding to the shape of the tracking coils,
wherein each of the tracking coils is non-rectangular and has at least two sides that are different in length from each other, and
wherein each lower rotation preventing projection surface-contacts only the inner surface of the bottom of each non-rectangular tracking coil and has a surface-contacting width greater than ⅓ of the inner surface of the bottom of each non-rectangular tracking coil and less than the entire width of the inner surface of the bottom of each non-rectangular tracking coil.

12. The optical pickup actuator according to claim 11, wherein the at least two rotation preventing devices each is vertically symmetrical.

13. The optical pickup actuator according to claim 11, wherein the non-rectangular tracking coils are trapezoidal in shape.

14. An optical pickup actuator, comprising:
a lens holder with at least one object lens;
focusing and tracking coils and magnets that are provided to move the lens holder;
an actuator fixing holder on which a supporting member configured to support the lens holder is fixed; and at least two rotation preventing devices formed on the lens holder, the at least two rotation preventing devices each surface-contacting inner surfaces of the tracking coils to prevent the tracking coils from being twisted, wherein the at least two rotation preventing devices include an upper rotation preventing projection formed in the shape of an asymmetrical structure corresponding to the shape of the tracking coil and a lower rotation preventing projection formed in the shape of an asymmetrical structure corresponding to the shape of the tracking coil, wherein the tracking coils are non-rectangular, and wherein the lower rotation preventing projection surface-contacts only the inner surface of the bottom of each non-rectangular tracking coil and has a surface-contacting width greater than 1/3 of the inner surface of the bottom of each non-rectangular tracking coil and less than the entire width of the inner surface of the bottom of each non-rectangular tracking coil.

15. The optical pickup actuator according to claim 14, wherein the non-rectangular tracking coils are trapezoidal in shape.

16. An optical pickup actuator, comprising:

a lens holder to which tracking and focusing coils are attached;

a plurality of magnets disposed facing the tracking and focusing coils; and at least two rotation preventing devices formed on the lens holder, the at least two rotation preventing devices surface-contacting inner surfaces of the tracking coils to prevent the tracking coils from being twisted, wherein each of the at least two rotation preventing devices is formed in the shape of an asymmetrical structure, wherein each of the tracking coils is non-rectangular and has at least two sides that are different in length from each other;

wherein each of the at least two rotation preventing devices corresponds to the shape of the non-rectangular tracking coils and has at least two sides that are different in length from each other, wherein a lower rotation preventing projection of the two rotation preventing devices is formed in the shape of an asymmetrical structure corresponding to the shape of the non-rectangular tracking coils, and wherein the lower rotation preventing projection surface-contacts only the inner surface of the bottom of each non-rectangular tracking coil and has a surface-contacting width greater than 1/3 of the inner surface of the bottom of each non-rectangular tracking coil and less than the entire width of the inner surface of the bottom of each non-rectangular tracking coil.

* * * * *